United States Patent Office 2,736,660
Patented Feb. 28, 1956

2,736,660

REFRACTORY COMPOSITION AND METHOD OF USE

Thomas E. Barlow, Jackson, Ohio, assignor, by mesne assignments, to International Minerals & Chemical Corporation, Chicago, Ill.

No Drawing. Application July 27, 1951,
Serial No. 239,023

5 Claims. (Cl. 106—64)

My invention relates to a refractory furnace patching composition, and to a method of applying the same.

An object of my invention is to provide a refractory composition of low cost, which at the same time displays high resistance to abrasion and possesses satisfactory refractory value and can be used as a patching material throughout the entire furnace without appreciable sacrifice either in cost or in desired good qualities, which possesses high adhesive qualities against the surface to be repaired, can be readily blown through a conventional blowing machine, sets rapidly to high strength, is highly resistant to mechanical abrasion, and is refractory to required degree.

Another object is to provide a stand-by furnace repair composition, possessing the general qualities just described and available for satisfactorily patching a furnace lining and which can be stored and made available for instant use, simply by the admixture of water thereto immediately prior to the application to the furnace.

A still further object is to provide a method of producing both a refractory patching composition of the type described as well as a method of patching a furnace lining, which method is at once simple, inexpensive and readily practiced, producing uniformly good results in all parts of the furnace and demanding only minimum investment in both plant and labor.

Other objects and advantages in part will be obvious and in part pointed out hereinafter during the course of the following description, the scope of the application of all of which will be more fully set forth in the claims at the end of this specification.

As conducive to a more thorough understanding of my invention it is interesting to note that in most high temperature furnaces as well as in other high temperature foundry practices, from time to time it becomes necessary to make repairs to the furnace refractories; illustratively, repairs of the furnace lining. This is due in large measure to the effects of mechanical abrasion, the fluxing effects of the slag at high temperature, or any combination of these factors. Usually such refractory repairs are carried out with fire brick, special refractory shapes, or refractory mortars and cements. It is well recognized, however, that these materials are all comparatively expensive, some refractory mortars costing as much as $250 per ton. Moreover, these refractory patching materials are somewhat difficult of application.

It is further recognized that certain parts of the furnaces, for example the upper part of a cupola melting furnace, are subjected primarily to abrasive wear, mechanical in nature, and are not necessarily required to display particularly high refractory values. It is apparent, however, that once the furnace is shut down and repair work undertaken, it is desirable to repair the entire furnace at one time. Moreover, it is equally apparent that it is desirable to use the same materials for the repair job throughout the furnace, so that it is necessary to stock-pile and employ but a single repair material.

This practical convenience, however, has heretofore been more than offset due to the high cost of any known single repair material which would be at all feasible, this for the reason that the refractory materials heretofore required for the high temperature parts of the furnace are very expensive, and their use is not economically justified for the comparatively low temperature upper parts of the furnace walls. And this is so, regardless of the practical convenience which would otherwise attend upon such factors. Conversely, the use of inexpensive materials, suitable for mechancial wear resistance encountered in the upper part of the furnace, have not heretofore displayed sufficient refractory qualities for use in the high temperature lower parts thereof.

An important object of my invention, therefore, is to avoid in substantial measure the disadvantages and difficulties heretofore confronting the art, and at the same time to produce a new composition for repairing furnace linings which can be satisfactorily employed as a single repair material for all parts of the furnace lining, both those parts that are subjected to mechanical wear and those which are subjected to high temperature and slag attack and which, low in cost, combines highly satisfactory properties of resistance to mechanical abrasion and good refractory characteristics, which material requires the use only of component ingredients which are readily available, and which are inexpensive both to produce and transport; which composition is simple to prepare and may be maintained ready for use for protracted periods of time without deterioration; and as well, to provide a method of producing and applying such composition, which method is itself simple, inexpensive and easily practiced, and certain and predictable in the end results achieved.

In describing the practice of my invention reference will be had, solely by way of illustration, to the ordinary cupola melting furnace such as is used in foundries. It will be recalled that this is a vertical, brick-lined furnace wherein the charging materials, such as pig-iron and scrap, together with coke for fuel and a suitable flux, are charged into the furnace from the top. It is at once apparent that in charging these ingredients considerable abrasion and wear results as they strike upon the upper walls of the furnace. And the upper walls of the furnace and the furnace lining are inclined to chip, crack and break away.

On the other hand, it is recognized that the lower parts of the furnace, where actual melting takes place, is subjected to constantly maintained high temperatures. Here the loss of refractories is high, due both to the high temperatures maintaining and to slag attack as well. Here too there is some abrasion at the slag line.

Some attempt heretofore has been made to blow a patching material onto the damaged regions of the highly refractory furnace walls in the melting zone. In the practice of such method the patching materials are dry-mixed in a machine and then blown through a hose to the point of use, being wetted with a water spray in the nozzle of the hose just before being shot at high velocity against the furnace wall. In the practice of this known method, however, very expensive materials have been required. Now, apart from the ever-present detriment of the high initial cost of such materials, making it totally impractical to use them in repairing the comparatively large lower temperature regions of the furnace which are subjected to mechanical abrasion, important practical difficulties have been encountered in properly applying these patching materials against the furnace so that the furnace can be shortly placed back into service and this with continued display of high strength.

Now, I have discovered a composition which substantially fulfills the requirements noted and which at the same time can be satisfactorily applied by blowing under high pressure conditions, both in the upper section of the cupola, where mechanical wear-resistance is required or in other furnaces where similar conditions exist, and as well, to the high temperature regions of the furnace, where the display of satisfactory refractory qualities is essential.

In the practice of my invention I have found that best results are obtained by combining a suitable coarse fraction with a compatible fine fraction and a refractory binder into a mixture. The coarse fraction, I found, should be a refractory product. I have found that it may be satisfactorily selected from calcined clay, crushed fire brick, silica gravel, crushed silica rock, calcined dolomite and calcined magnesite. While mixtures were found to be satisfactory wherein the size of the coarse fraction varied from one-half inch to those particles retained on a 40 mesh sieve, I obtained best results where this fraction was comprised of particles maintained within a range such that they would pass a ⅜ inch screen while being retained on a 20 mesh screen. Round silica gravel was found to move most readily through the blowing machine and hose. In addition there is the further advantage that the rounded particles seem to have a peening action against the wall of the furnace, producing maximum density of the material within the patch. This effect is particularly important to long patch life.

In generally like manner the fine fraction should be composed of similar materials of proper size. From a practical standpoint including the elements of ready availability throughout the country together with low cost, I found clean fine silica sand or crushed silica to be highly satisfactory for this fine aggregate. I have made compositions wherein the fine aggregate had a fineness ranging from 50 mesh to 300 mesh sieve. Preferably, however, I find that the bulk of the fine fraction should be concentrated on the 50, 70, 100 and 150 mesh screens.

For the binder, refractory cement was found to be best, this ingredient combining the qualities of good holding, satisfactory refractory life and low cost, all with ready availability. A typical example thereof is Lumnite cement (calcium aluminate cement), such as is produced by Atlas Lumnite Cement Company. Any typical and satisfactory refractory cement can be advantageously employed, however, provided only that it possesses the refractory qualities characteristic of this type of cement. I find that this cement acts generally as does Portland cement but results in a more refractory product.

It is important that all materials be absolutely free of moisture as preliminarily mixed and prior to introduction into the spray gun. This is necessary to prevent the cement from taking any initial set prior to actual use. Where the dry materials are commingled well in advance of use, to serve as stand-by patching composition, then it is desirable to use bags with moisture-proof liners.

I have pointed out hereinbefore that it is most desirable that the patch set as quickly as possible after application and that at the same time, this be achieved without appreciable reduction in the ultimate strength which the patch otherwise would attain. To achieve this rapid initial set I have tried the addition of a variety of materials to the composition. Amongst these are plaster-of-Paris, calcium chloride and other similar rapid-set agents. While many of them have been effective in increasing the speed of initial set, they have proved unsatisfactory because attended by a serious loss of strength. I have discovered, however, that the addition of about 2% pulverized fire clay to the composition gives a very substantial reduction in the time of initial set, and this with only modest loss of strength.

The results of laboratory tests on several compositions according to my invention are set forth in the following Table I in which the proportions are parts by weight, the percentage of weight being indicated in brackets:

TABLE I

*Strength and time of setting for several patching compositions*

| Coarse Silica | Fine Silica | Refractory Cement | Percent Water Added | Compressive Strength, Pounds per sq. inch | | Time Initial Set, Minutes |
|---|---|---|---|---|---|---|
| | | | | 24 hrs. | 48 hrs. | |
| 4(57%) | 2(29%) | 1(14%) | 12 | 1,750 | 2,530 | 210 |
| 3(50%) | 2(33%) | 1(17%) | 12 | 2,230 | 3,180 | -------- |
| 4(53%) | 2(27%) | 1.5(20%) | 12 | 3,270 | 4,740 | 100 |
| 4(53%) | 2(27%) | ¹ 1.5(20) | 12 | 3,030 | 3,100 | 40 |

¹ 2% pulverized fire clay added.

Moreover, a number of coarse-fine silica-refractory cement compositions were plant tested in which the compositions were applied to a furnace lining. These results are given in Table II below, the percentage figures being by weight:

TABLE II

| Coarse Silica, Percent | Fine Silica, Percent | Refractory Cement, Percent | Results |
|---|---|---|---|
| 64.4 | 24.6 | 11.0 | Would not stick to wall—too weak. |
| 61.0 | 23.4 | 15.6 | Would not stick to wall—fair strength. |
| 38.8 | 50.2 | 17.0 | Too fine, would not feed through gun. |
| 45.0 | 34.4 | 20.6 | Do. |
| 40.2 | 43.2 | 16.6 | Same trouble feeding — good strength. |
| 47.5 | 36.2 | 16.3 | Satisfactory in sticking to wall—good strength. |

From the foregoing Table II it will be seen that many of the compositions are not satisfactory in actual furnace practice; they would not stick well to the furnace wall. I prefer a composition that adheres tenaciously to the wall and, at the same time, gives good final strength. Such a composition is that disclosed last in Table II.

The range of composition according to my invention, therefore, as taken from Table I and the composition of Table II, is: coarse silica 47.5% to 57%, fine silica 23% to 37%, and refractory cement 14% to 20%. Where desired, as indicated above, a small amount of pulverized fire clay, say 2%, may be added to the composition. The composition is highly critical because, as indicated in Table II above, I find that with any substantial departure from the figures given there is a loss of one or more of the desired properties.

My new composition, while low in cost, can be employed as a single patching material for all parts of a furnace lining where extremely high temperatures are not encountered, and this giving particular satisfaction in patching the upper, abrasion-exposed parts of the wall, the composition displaying both satisfactory wear-resistant qualities and adequate refractory qualities. Moreover, the composition of such consistency is comprised of such ingredients that it can be fed through a blowing machine in satisfactory manner by pressure and mechanical agitation. Moreover, when wetted in the gun, it displays sufficient adhesive qualities to adhere tenaciously to the wall undergoing repair. Finally, it sets rather rapidly, displaying high ultimate strength together with satisfactory refractory qualities.

In addition, my composition thus produced may be applied according to the practice of my method in ready and inexpensive manner at any region of the furnace, and once applied, rapidly sets to high ultimate strength.

All the foregoing, as well as many other highly practical objects and advantages, attend upon the practice of my invention.

It is apparent from the foregoing that once the broad aspects of my invention are disclosed, many embodiments thereof will readily suggest themselves to those skilled in the art, all falling within the scope of my disclosure, accordingly, I intend the foregoing disclosure to be considered as simply illustrative, and not be taken by way of limitation.

I claim:
1. A fluid composition for repairing the refractory linings of high temperature furnaces, essentially consisting by weight of solid ingredients approximately 47.5% to 57% coarse silica fraction of about ½ inch to 40 mesh, about 23% to 37% fine silica fraction of about 50 to 300 mesh, and about 14% to 20% refractory cement; and to which there is added about 12% water.

2. A prepared composition essentially consisting by weight of approximately 47.5% to 57% round silica gravel of about ½ inch to 40 mesh, about 23% to 37% fine silica fraction of about 50 to 300 mesh, and about 14% to 20% refractory cement.

3. A prepared composition, essentially consisting by weight of approximately 50% coarse fraction of silica gravel ranging in size from ½ inch to 40 mesh, about 35% fine fraction of silica ranging from 50 to 300 mesh, and about 15% refractory cement.

4. A prepared composition, essentially consisting by weight of approximately 50% coarse fraction of silica gravel ranging in size from ½ inch to 40 mesh, about 35% fine fraction of silica ranging from 50 to 300 mesh, and about 15% refractory cement which composition also includes about 2% pulverized fire clay.

5. The method of repairing furnace refractory linings, comprising blowing at high pressure against the furnace walls in the region of repair a fluid composition essentially consisting by weight of solid ingredients approximately 47.5% to 57% coarse silica fraction of about ½ inch to 40 mesh, about 23% to 37% fine silica fraction of about 50 to 300 mesh, and about 14% to 20% refractory cement; and to which there is added about 12% water.

References Cited in the file of this patent

UNITED STATES PATENTS

| | | |
|---|---|---|
| 944,694 | Pope | Dec. 28, 1909 |
| 1,125,741 | Schwarz | Jan. 19, 1915 |
| 1,787,625 | Hutchinson | Jan. 6, 1931 |
| 2,124,865 | Winkler | July 26, 1938 |
| 2,511,724 | Lobaugh | June 13, 1950 |
| 2,511,725 | Lobaugh | June 13, 1950 |

FOREIGN PATENTS

| | | |
|---|---|---|
| 3,755 | Sweden | 1892 |
| 150,628 | Germany | 1904 |
| 506,283 | France | 1920 |
| 728,991 | Germany | 1942 |
| 591,243 | Great Britain | 1947 |